US010743521B2

(12) United States Patent
Newton

(10) Patent No.: US 10,743,521 B2
(45) Date of Patent: Aug. 18, 2020

(54) LEASH CONTROL DEVICE FOR WALKING MULTIPLE PETS

(71) Applicant: Craig P. Newton, Cleveland, OH (US)

(72) Inventor: Craig P. Newton, Cleveland, OH (US)

( * ) Notice: Subject to any disclaimer, the term of this patent is extended or adjusted under 35 U.S.C. 154(b) by 142 days.

(21) Appl. No.: 15/671,203

(22) Filed: Aug. 8, 2017

(65) Prior Publication Data

US 2018/0064067 A1    Mar. 8, 2018

Related U.S. Application Data

(60) Provisional application No. 62/495,151, filed on Sep. 6, 2016.

(51) Int. Cl.
*A01K 27/00* (2006.01)

(52) U.S. Cl.
CPC .................. *A01K 27/003* (2013.01)

(58) Field of Classification Search
CPC .... A01K 27/00; A01K 27/003; A01K 27/005; F16G 11/044; F16G 11/048; A45F 2005/1053; A45F 5/1026; A45F 5/102
USPC ................ 119/769, 795, 797, 799; 24/122.6; 294/159, 160, 162, 163
See application file for complete search history.

(56) References Cited

U.S. PATENT DOCUMENTS

| | | | | |
|---|---|---|---|---|
| 4,236,281 A * | 12/1980 | Bottum | ................. | F16G 11/048 24/115 R |
| 5,671,508 A * | 9/1997 | Murai | ................... | F16G 11/101 24/115 K |
| 5,701,848 A * | 12/1997 | Tozawa | ................. | A01K 27/003 119/795 |
| 5,732,662 A * | 3/1998 | Jacobsen | ............. | A01K 27/003 119/798 |
| 6,223,694 B1 * | 5/2001 | Rubin | .................. | A01K 27/003 119/795 |
| 6,460,488 B1 * | 10/2002 | Manzella | ............. | A01K 27/003 119/712 |
| 6,712,026 B1 * | 3/2004 | Carville, Jr. | ......... | A01K 27/004 119/794 |
| 9,363,982 B2 * | 6/2016 | Fleming | ............... | B66D 1/7415 |
| 2013/0298847 A1 * | 11/2013 | McAllister | ........... | A01K 27/003 119/799 |

(Continued)

FOREIGN PATENT DOCUMENTS

DE    102012100385 A1 *    7/2013    ........... A01K 27/001

*Primary Examiner* — Lisa L Tsang
(74) *Attorney, Agent, or Firm* — Daniel Kirshner

(57) ABSTRACT

Leash control device for attachment to multiple leashes permitting a dog walker to walk dogs of different sizes and temperaments and inhibits leash tangling An elongated tubular body has a bottom and a cover, both the bottom and the cover having aligned tracks. The bottom track has indentations in the nature of stops spaced at intervals. Leash attachment members are positioned into the bottom tracks, and telescope with respect to the tracks. Leashes are attached to the leash attachment members. The leash attachment members have upright handle locks that interact with the indentations on the bottom tracks thereby being locked in place. The cover may be closed, with the upright locking handles protruding through the tracks on the cover. By telescoping the leash attachment members in and out of the elongated tubular body, the length of each individual leash is selected.

2 Claims, 10 Drawing Sheets

(56) References Cited

U.S. PATENT DOCUMENTS

2016/0007572 A1\* 1/2016 Aked-Hurditch .... A01K 27/005
119/707

\* cited by examiner

LEASH CONTROL DEVICE FOR WALKING MULTIPLE PETS

CROSS REFERENCE TO RELATED APPLICATION

The present application claims priority to the earlier filed provisional application having Ser. No. 62/495,151 and a filing date of Sep. 6, 2016, and hereby incorporates the subject matter of the provisional application in its entirety.

FIELD OF THE INVENTION

The present invention is a device for attachment to and to control multiple pet leashes. More specifically, the present invention leash control device includes a plurality of attachments for multiple leashes, wherein a user can individually control the respective length and position of each of the leashes thereby inhibiting tangling.

BACKGROUND OF THE INVENTION

When people walk dogs (or cats, or for that matter other pets) in public, the dog walker typically employs a leash, which leash is attached to the dog's collar, in order to control the movement of the dog. Moreover, people may own multiple dogs and wish to walk and control all of their dogs simultaneously. Furthermore, in modern society, dog walking has become a professional vocation, where a dog walker is hired to walk the dogs for multiple owners simultaneously.

A problem develops where the multiple dogs being walked simultaneously are of different sizes. Moreover, different dogs have different activity levels. As such, the use of multiple leashes for multiple dogs becomes cumbersome. Furthermore, when walking multiple dogs at the same time utilizing multiple leashes, the leashes tend to become tangled with each other.

As such, it is an objective of the present invention to present a device to which multiple leashes can be attached. It is an objective of the present invention for a dog walker to be able to individually adjust the length of each of the leashes attached to the device. It is an objective of the present invention to be able to control the spacing between multiple dogs being walked simultaneously. Finally, it is an objective of the present invention to prevent the multiple leashes from being tangled up with each other when multiple dogs are being walked together.

Other objects, advantages and novel features, and further scope of applicability of the present invention will be set forth in the detailed description to follow, taken in conjunction with the accompanying drawings, and in part will become apparent to those skilled in the art, upon examination of the following, or may be learned by practice of the invention. The objects and advantages of the invention may be realized and attained by means of instrumentalities and combinations particularly pointed out in the appended claim or claims.

SUMMARY OF THE INVENTION

The present invention is a leash control device for attachment of multiple leashes that permits a dog walker to walk dogs of different sizes and temperaments and inhibits the multiple leashes from getting tangled with each other. An elongated tubular body has a bottom and a cover, both the bottom and the cover having tracks which top and bottom tracks are aligned with each other. The bottom track has indentations in the nature of stops spaced at intervals. Leash attachment members are positioned into the bottom tracks, and telescope with respect to the tracks. Leashes are attached to the leash attachment members. The leash attachment members have upright handle locks which interact with the indentations on the bottom tracks thereby locking the leash attachment members in position. The cover may be closed, with the upright locking handles protruding through the tracks on the cover. By telescoping the leash attachment members in and out of the elongated tubular body, the length of each individual leash may be selected.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

The present invention is a device to which multiple pet leashes may be attached, thereby permitting the pet walker to walk multiple pets simultaneously, all while having the ability to adjust the length of the individual leashes and controlling each of the individual leashes for each pet. As such, the leashes attached to the present invention are inhibited from tangling with each other.

Looking at the figures, the present invention leash control device, designated generally as 10 includes an elongated tubular body 12. Although shown as an elongated tubular body, other shaped elongated bodies may be employed. The elongated tubular body includes or is attached to a handle 14, which handle may be ergonomically configured to have finger notches to conform to the user's hand. The handle may be covered with fabric or rubber for comfort. The tubular body of the present device has a bottom member 16 and a cover 18 which cover may be hinged or otherwise attached to the bottom member. Thus, the cover can be opened using its hinges or otherwise removed to permit access to the interior of the elongated tubular body and then closed when desired.

Figure 1:
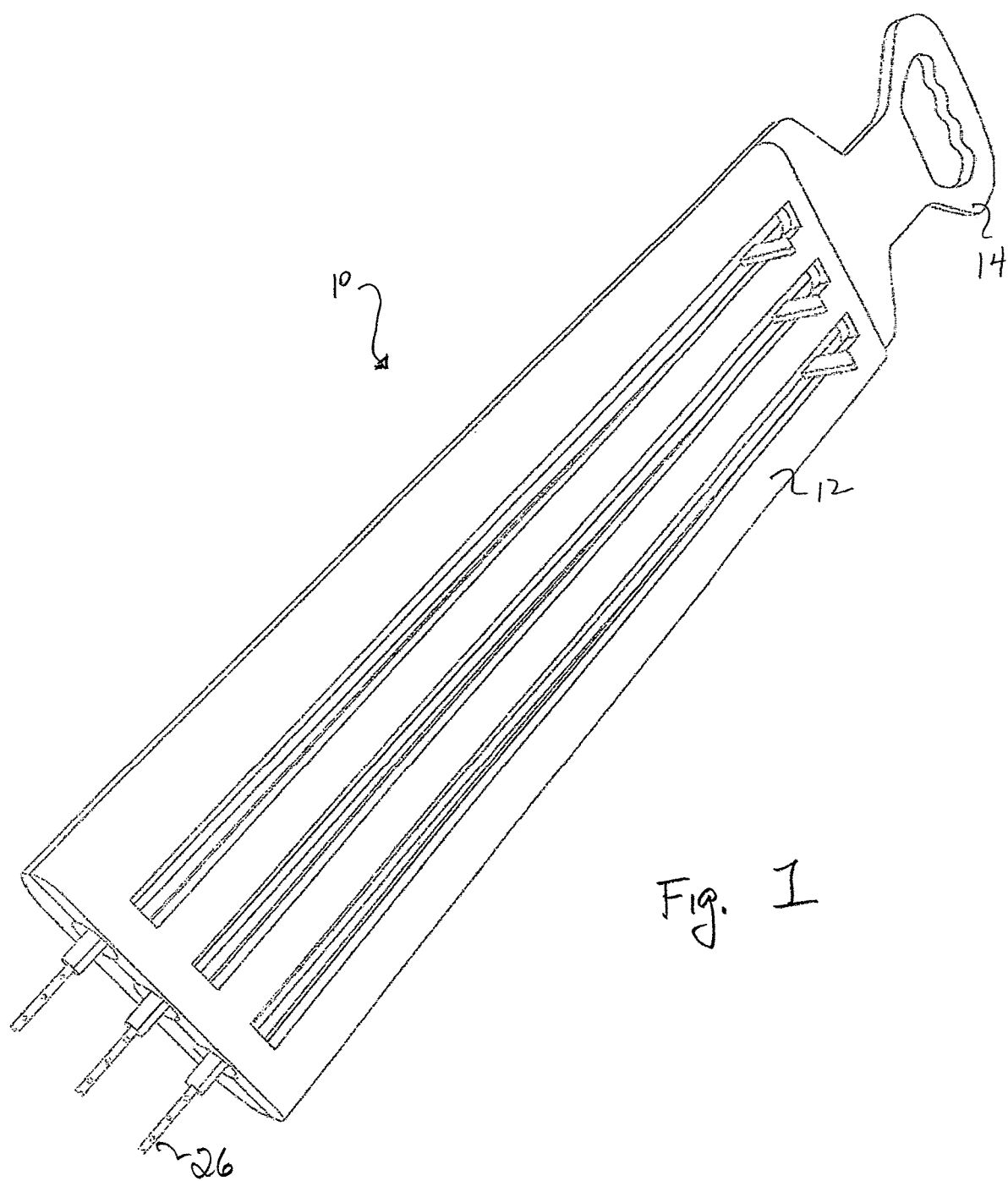
FIG. 1 is a side perspective view of the present invention leash control device showing its cover in a closed configuration.
Figure 2:
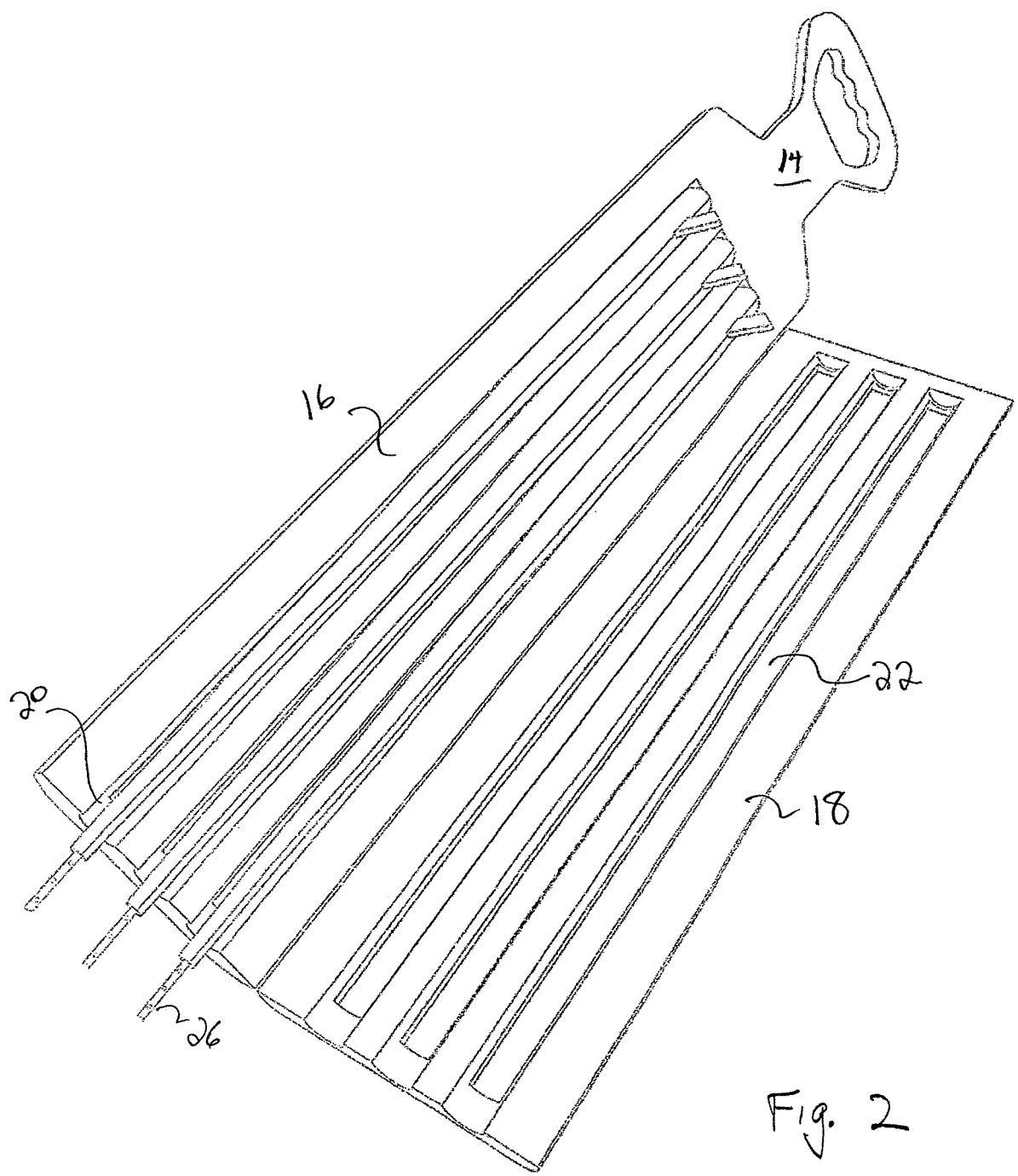
FIG. 2 is a side perspective view of the present invention leash control device showing its cover in an open configuration.
Figure 3:
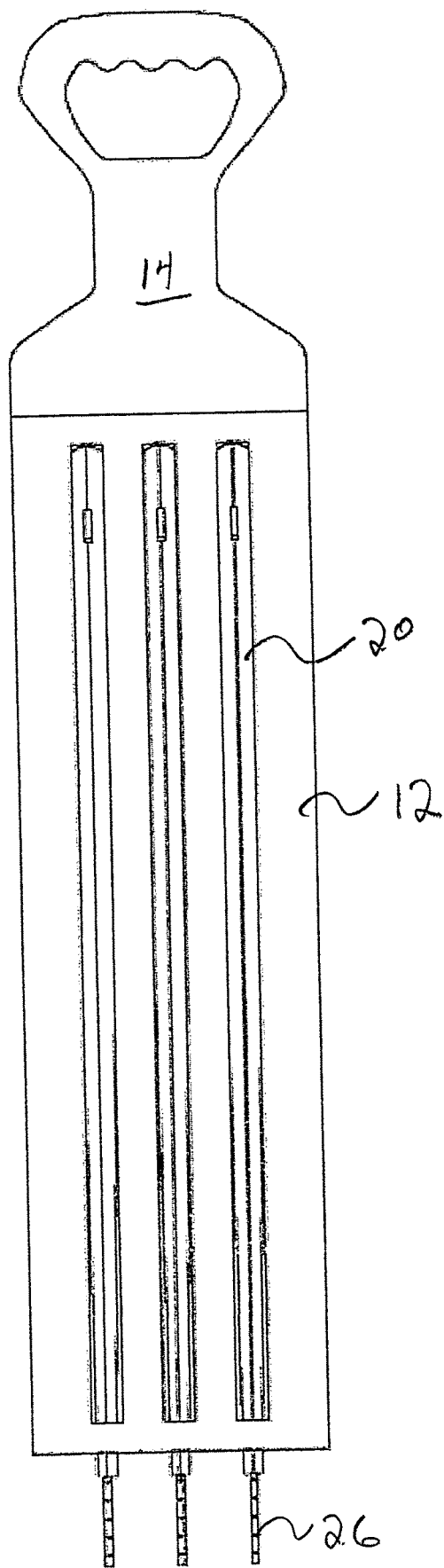
FIG. 3 is a top view of the present invention leash control device.
Figure 4:
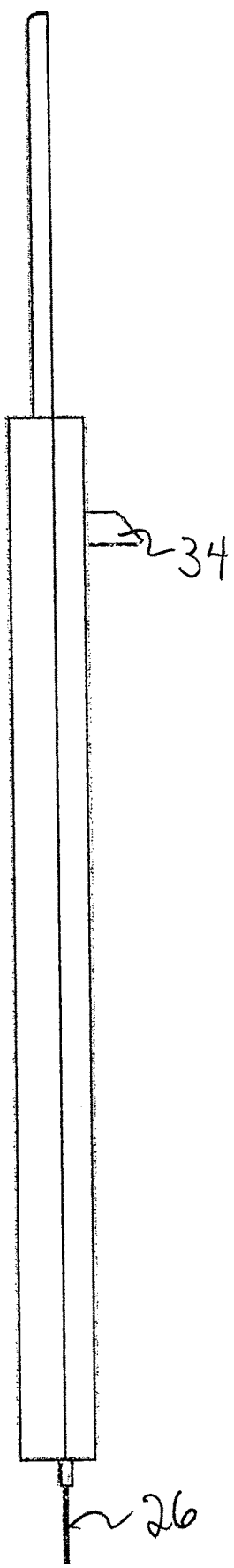
FIG. 4 is a side view of the present invention leash control device.
Figure 5:
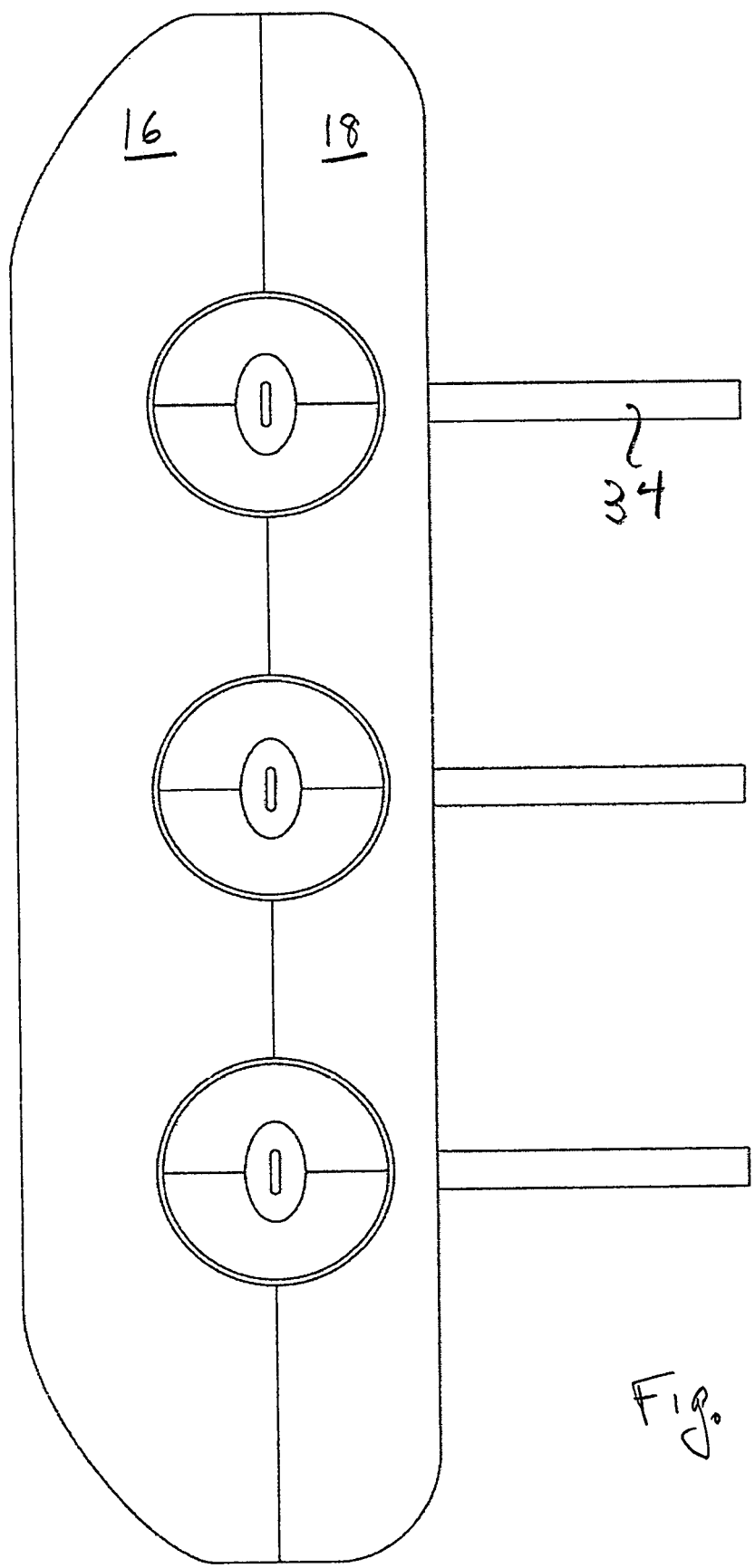
FIG. 5 is a front view of the present invention leash control device.

Now, looking closely at FIG. 2, it can be seen that the bottom member of the elongated body has a plurality of tracks 20 for insertion of the leash attachment members. The track consist of depressions into the bottom member. (It is noted that in the preferred embodiment shown, the leash control device of the present invention is configured with three tracks for insertion of three leash-attachment members. However, the present invention can be reconfigured for any plurality of leash-attachment members. As such, similar devices for controlling two, three, or more than three leashes are all to be considered within the scope of the disclosure of this invention.) Similarly configured and positioned tracks 22 are located in the cover which tracks consist of slots that extend through the cover. It is noted that the tracks are closed at the end nearest to the handle, and present openings at the front end of the elongated body as can best be seen in the front view of FIG. 5. It is further noted that the tracks on the bottom and the tracks on the cover are positioned so that when the cover is closed, the tracks align perfectly with each other.

Figure 6:
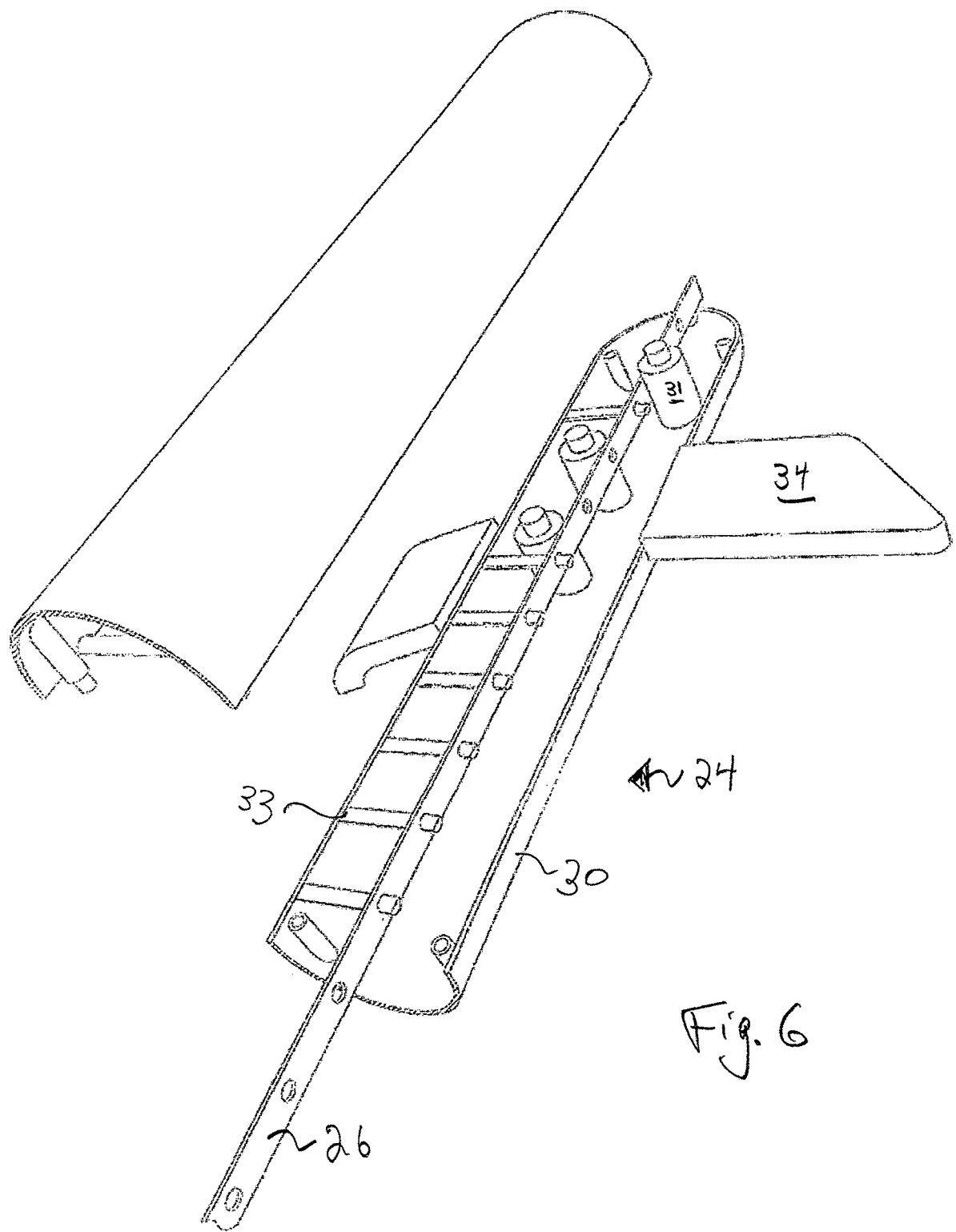
FIG. 6 is an exploded view of the leash attachment member of the present invention leash control device.
Figure 7:
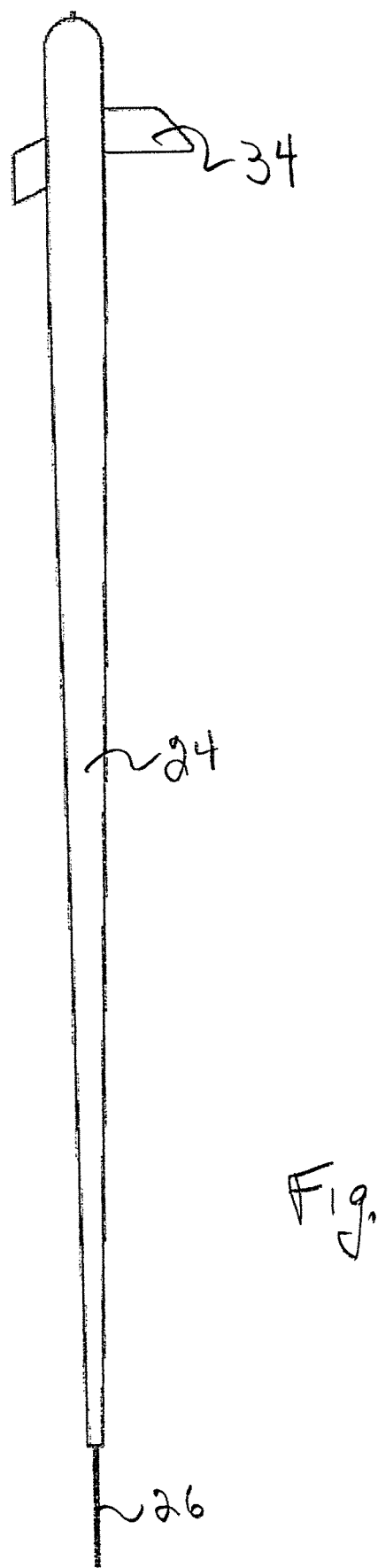
FIG. 7 is side view of the leash attachment member of the present invention leash control device.
Figure 8:
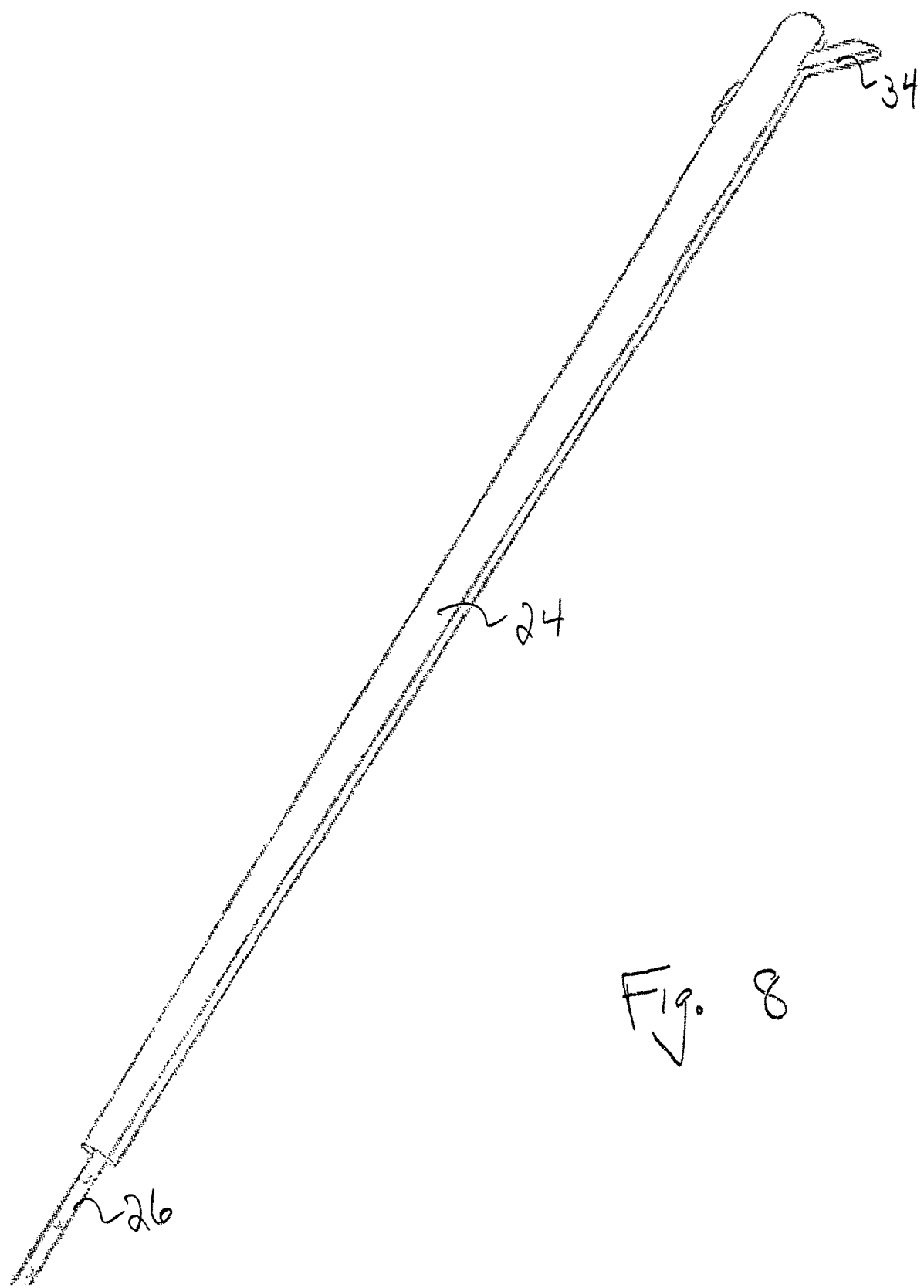
FIG. 8 is side perspective view of the leash attachment member of the present invention leash control device.

Looking next at FIGS. 6 through 8, a plurality of leash attachment members 24 are provided, the plurality being equal in number to the number of tracks on the body. Thus, in the preferred embodiment in the figures, three leash attachment members are provided to reside in each of the three tracks. The leash attachment members are internally configured for use with standard pet leashes or specially designed leashes designated as 26, which are encased in an enclosure 30 which enclosure can be snapped together or apart easily in order to add, remove or swap out a leash. Throughout the leash attachment member 30 are a series of tabs in the nature of locking pins 33 Important to the function of the present invention are the upright handle locks 34 which extend up vertically from the enclosure. The upright handle locks may include a rubber overlay for ease of gripping.

Still looking at the enclosure 30, and best viewed in FIG. 6, it is disclosed that the enclosure has male and female snaps 31. The snaps permit a user to easily assemble or disassemble the enclosure, thereby granted the user ready access to the interior of the enclosure, and thereby facilitating addition, removal or substitution of leashes.

Figure 9:
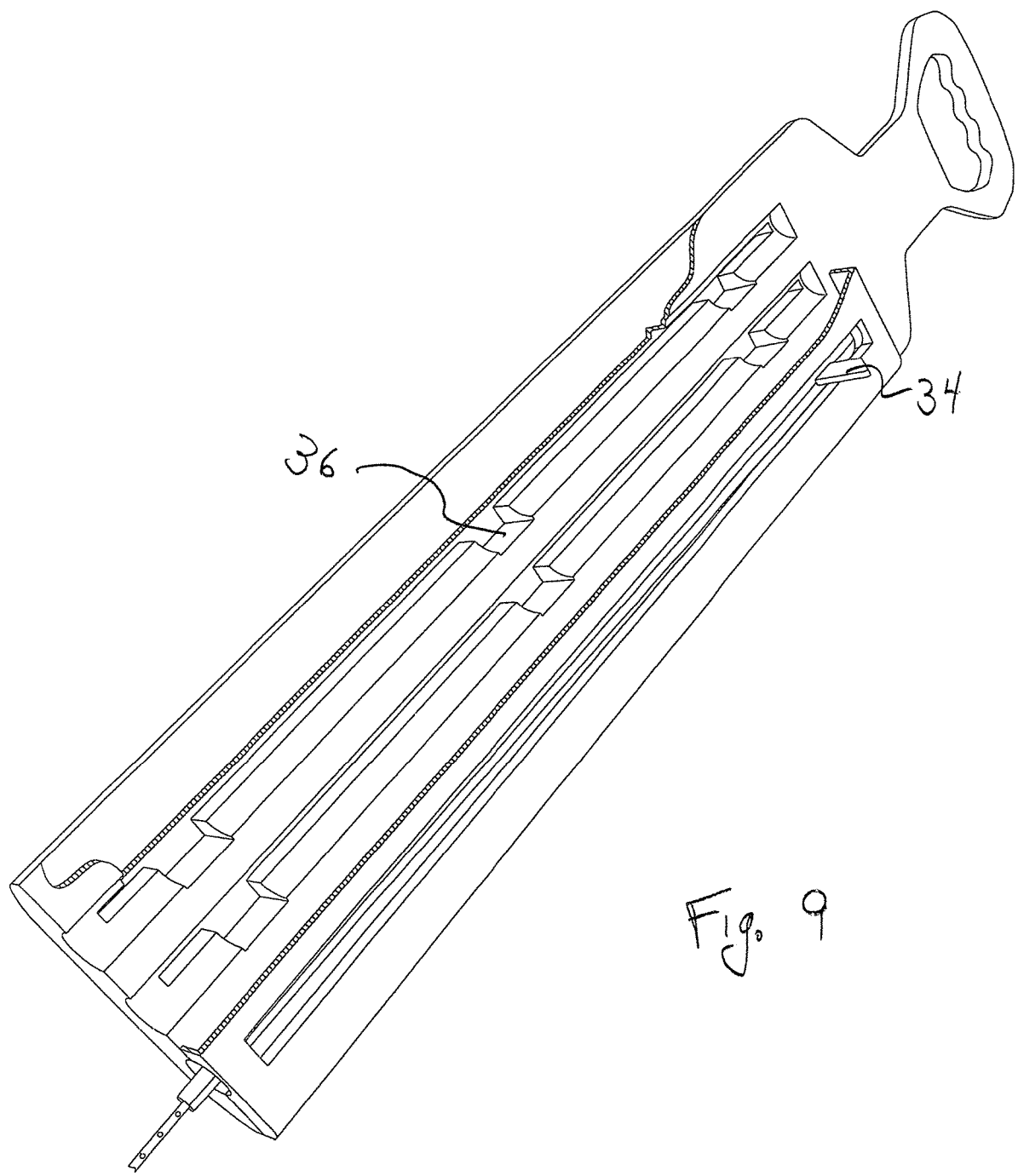
FIG. 9 is a partially cutaway view of the present invention leash control device.
Figure 10:
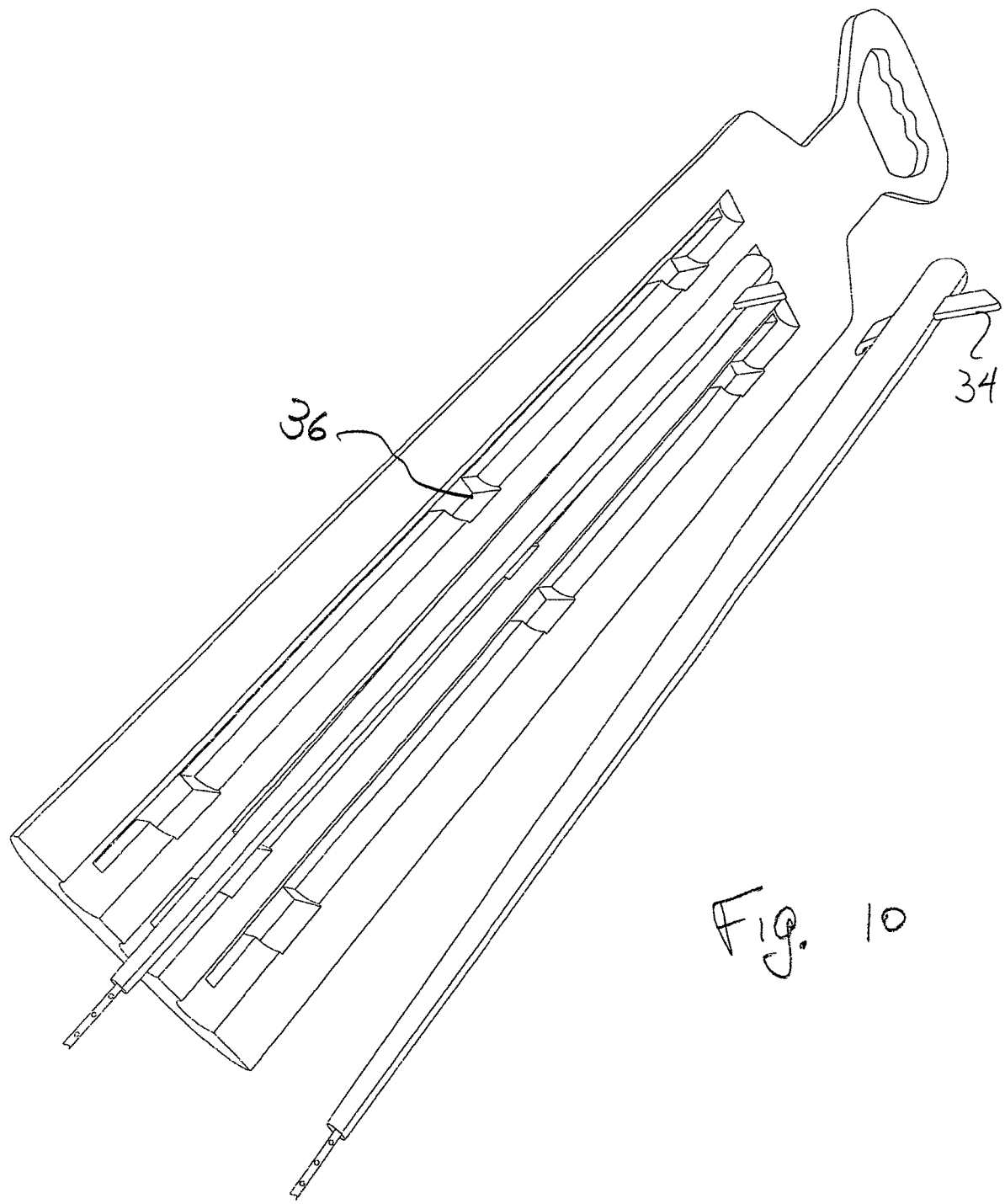
FIG. 10 is a side perspective view of the present invention leash control device with the cover removed and showing the locking mechanism in an exploded condition.

Each of the leash attachment members is fitted into the tracks with the upright handle locks extending vertically upward out of the track on the bottom member and correspondingly up and through the track on the cover. Each of the tracks on the bottom has a series of indentations 36, best seen in FIGS. 9 and 10 which indentations are spaced along the bottom tracks. These indentations are sized and configured to receive the upright handle locks 34. The indentations serve as stops to fix the length of the leash at predetermined locations.

To use the present invention, with the cover of the device open, multiple leashes are attached to each of the leash attachment members. Each of the leash attachment members is manipulated forward or back according to the desired length of the leash. As such, the leash attachment members telescope with respect to the tracks of the elongated body, thereby allowing the user to lengthen or shorten the leash to which it is attached. The upright handle locks of each the leash attachment members are locked into place by insertion of the upright handle lock into the appropriately chosen indentation thereby stopping the leash attachment member into its chosen location. This process is repeated for each the leashes to be controlled by the present leash control device. Thereupon the cover is closed, with the upright handle locks protruding through the track on the cover.

By spacing the various leash attachment members along the various tracks, the dogs being walked are spread out. The user can choose the position of each of the leash attachment members by selectively locking the respective upright handle locks into one of the chosen indentions on track on the bottom of the elongated tubular body. As such, the individual length of each of the leashes is chosen according to the size and activity level of the dog attached to the specific leash. Therefore, through proper employment of the present invention leash control device, the leashes are prevented from tangling with each other.

The foregoing is considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modifications and equivalents may be resorted to, falling within the scope of the invention.

What is claimed:

1. A leash control device for attaching pet leashes and walking multiple pets simultaneously, comprising:
an elongated tubular body having an ergonomic handle at one end, said elongated tubular body having a bottom member and a cover, said bottom member and said cover each having three tracks, the tracks in the bottom member including indentations, the tracks on the bottom member and the tracks on the cover being in alignment with each other;
three leash attachment members situated in the three tracks of the bottom member, said leash attachment members including locking pins to attach pet leashes, wherein said leash attachment members telescope with respect to said tracks of the bottom member, thereby lengthening or shorting length the attached leash, said leash attachment members including upright handle locks, wherein said leash attachment members are selectively locked into position by locking said upright handle locks into said indentations in said tracks on said bottom member.

2. A leash control device for attaching pet leashes and walking multiple pets simultaneously, comprising:
an elongated body, said elongated body having a bottom member, said bottom member having a chosen number of tracks, the tracks in the bottom member including indentations;
a number of leash attachment members having the same number as the chosen number of tracks of the bottom member, said leash attachment members including locking pins to attach pet leashes, wherein said leash attachment members telescope with respect to said tracks of the bottom member, thereby lengthening or shorting the attached leash, said leash attachment members including upright handle locks, wherein said leash attachment members are selectively locked into position by locking said upright handle locks into said indentations in said tracks on said bottom member.

* * * * *